Figure 1:
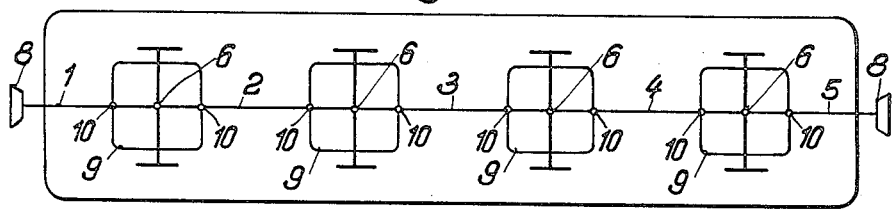

July 24, 1956     E. KREISSIG     2,755,746

LINKED RUNNING ASSEMBLIES

Filed Feb. 18, 1953

United States Patent Office 2,755,746
Patented July 24, 1956

2,755,746

LINKED RUNNING ASSEMBLIES

Ernst Kreissig, Krefeld-Uerdingen, Germany, assignor to Waggonfabrik Uerdingen Aktiengesellschaft, Krefeld-Uerdingen, Germany, a German company Application February 18, 1953, Serial No. 337,575

4 Claims. (Cl. 105—176)

This invention relates to a novel bogie arrangement for a rail vehicle in which all wheel axles, even when negotiating curves, are maintained perpendicular to the direction of the track to obviate derailment thereof even at very high speeds. The invention is particularly suitable for use with rail vehicles having a central buffer coupling, the normal side buffers and coupling as commonly used being omitted.

According to the present invention there is provided a bogie arrangement for a rail vehicle, the bogie arrangement comprising a chain that includes a plurality of links, and a first pivotal connection between adjacent ends of each adjacent pair of links, the axes of the first pivotal connections being substantially parallel and the links being in a straight line when the vehicle is on a straight length of railway track; a bogie frame associated with each first pivotal connection; a second pivotal connection between each bogie frame and each of the two links associated with the last-mentioned first pivotal connection, the two second pivotal connections associated with each frame being spaced from the associated first pivotal connection; and a pair of co-axial wheels rotatably mounted on each frame, the wheels of each pair being on opposite sides of the chain, each first pivotal connection lying in the vertical plane through the axes of the associated pair of wheels, and the bogie frames being resilient to permit, by flexure thereof, pivotal movements of the links when the rail vehicle negotiates a curved length of track.

It will be appreciated that the arrangement of a maximum number of pairs of wheels below each rail vehicle will enable the vehicle body and load to be supported at an equivalent number of points thereby to reduce the normal static wheel pressure occurring between wheels and rail. In addition, pairs of wheels having a very light construction retain the unsprung weight of each vehicle at a low value thereby to reduce the hammer action between the wheels and the rail which also acts as a shock impulse on the vehicle body. With the present bogie arrangement, the shock action of the track on the vehicle body is appreciably reduced since, on the one hand, the shock effect emitted by the separate wheels is greatly reduced, and on the other hand by using as many light wheels as are possible instead of a relatively few heavy wheels, there is obtained a balancing effect between the shock impulses transmitted by the springs to the vehicle body. The same action also occurs with respect to the horizontal shock impulses which, for example, become unpleasantly apparent particularly with a track having non-uniform curvatures. With the present bogie arrangement, these shock impulses are distributed to the plurality of axles employed whereby their individual effect will be reduced or even cancelled out by each other.

Figure 2:
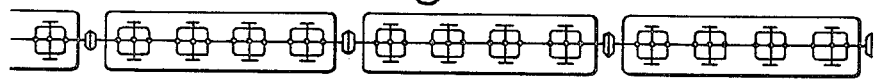
Figure 5:
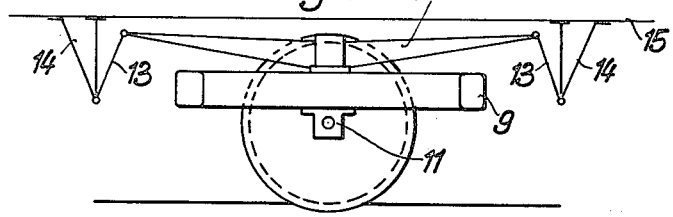
Figure 3:
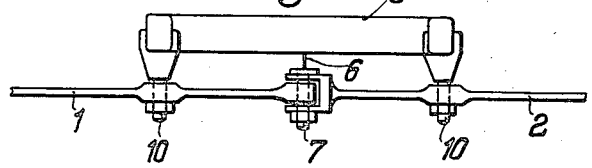
Figure 4:
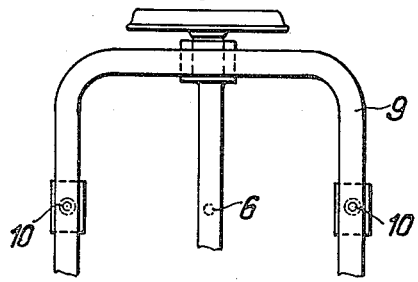

For a better understanding of the invention and to show how the same may be carried into effect, reference will now be made to the accompanying drawings in which:

Figure 1 shows a rail vehicle in plan view, incorporating the bogie arrangement according to the present invention, Figure 2 is a plan view of a train consisting of several rail vehicles, Figure 3 shows a longitudinal section of part of the bogie arrangement, Figure 4 is a fragmentary plan view of Figure 3, and Figure 5 is a longitudinal section of a further part of the bogie arrangement.

As illustrated in the drawings, the pairs of wheels of each rail vehicle are connected by a central chain which consists in the example shown in Figure 1, of five rod-like chain links 1, 2, 3, 4 and 5 which latter are interconnected at articulation points 6 by bolts 7 for horizontal displacement. As will be seen in Figure 1, each point 6 lies in the vertical plane through the axes of the associated wheels. As mentioned previously the wheels are light in weight and the maximum number are employed below each vehicle which will enable the latter to be supported at an equivalent number of points thereby to reduce the normal static wheel pressures occurring between the wheels and rail. The light weight wheels will, of course, reduce the unsprung weight of the vehicle and therefore the hammer action occurring between the wheels and rail. The rods 1 and 5 carry a central buffer coupling 8 at their outer ends which enable two or more vehicles to be joined to form a train; the coupling 8 is arranged to effect a positive connection which is resistant to bending with the adjacent link 1 or 5 of the other vehicle. The lengths of the links 2 to 4 are of the same dimensions though the links 1 and 5 may be modified in length to allow for overhanging of the vehicle body. Adjacent links, for example 1 and 2 are articulately connected by bolts 10 with a light weight bogie frame 9 carrying the bearings for a pair of wheels as shown in Figures 3 and 4; the bolts 10 are connected fast with the frame 9 and the axle of each pair of wheels is perpendicular to the axis 10—10. As illustrated in Figure 5, the frame 9 is rigidly connected with axle boxes 11, but this connection may be such that a small vertical resilient movement is possible between the frame 9 and the said box 11. However, no relative horizontal displacement is possible between the two parts. As also shown in Figure 5, the central part of a leaf spring 12 is secured to the frame 9, adjacent each wheel. The ends of each spring 12 are connected to the vehicle body 15 by way of spring supports 14 and long suspension spring links 13 that depend from the ends of the spring 12 and absorb horizontal shock actions occurring between the track and wheels.

Since the connecting bolts 7 are not fixed to the vehicle frame they will move laterally when the vehicle rounds a curve in the track despite the fact that the bolts 10, 10 are connected fast with the frame 9. Although the distance between the bolts 10, 10 must decrease to permit the above movement, the distance is so small that it will be readily compensated for by the natural resiliency of the frame 9, very slight stresses being set up. It will further be seen that a connecting line between the points 10—10 will form the base of an equilateral triangle 10—7—10, point 7 being the laterally displaced bolt 7. Since the base angles 10 of the triangle must be equal and the axle of the wheel pair is perpendicular to the line 10—10, i. e. the angle 7 is bisected, the said axle is obviously perpendicular to the direction of the track also. It must of course be remembered that there is no connection between the chain links and the axle and they move above or below the latter depending on the constructional arrangement employed.

In addition to the foregoing, it will be seen that the maximum number of wheel pairs employed will greatly reduce or even entirely eliminate the horizontal shock impulses, since these shocks will be distributed to the many axles utilized.

Finally, if the bogie arrangement employs wheels rotatably mounted on non-rotating axles, the latter may be cranked at their centres to provide spaces for the lateral displacement of the chain links about their articulation points 6.

I claim:

1. A bogie arrangement for a rail vehicle, the bogie arrangement comprising a chain that includes a plurality of links, and a first pivotal connection between adjacent ends of each adjacent pair of links, the axes of the first pivotal connections being substantially parallel and the links being in a straight line when the vehicle is on a straight length of railway track; a bogie frame associated with each first pivotal connection; a second pivotal connection between each bogie frame and each of the two links associated with the last-mentioned first pivotal connection, the two second pivotal connections associated with each frame being spaced from the associated first pivotal connection; and a pair of co-axial wheels rotatably mounted on each frame, the wheels of each pair being on opposite sides of the chain, each first pivotal connection lying in the vertical plane through the axes of the associated pair of wheels, and the bogie frames being resilient to permit, by flexure thereof, pivotal movements of the links when the rail vehicle negotiates a curved length of track.

2. A bogie arrangement according to claim 1, and further comprising a buffer coupling on the free end of each of the two end links of the chain, for fixed joining of each end link of the bogie arrangement with an end link of an adjacent similar bogie arrangement.

3. A bogie arrangement according to claim 1, and further comprising a leaf spring adjacent each wheel, the central part of the leaf spring being secured to the associated bogie frame, a suspension link depending from each end of each spring, and a plurality of supports for carrying the body of the vehicle, the lower ends of the links being connected one to each support.

4. A bogie arrangement according to claim 3, wherein the suspension links are themselves constructed as springs.

References Cited in the file of this patent

UNITED STATES PATENTS

| | | |
|---|---|---|
| 135,716 | Lamason | Feb. 11, 1873 |
| 1,304,577 | Krakau | May 27, 1919 |
| 2,030,010 | Liechty | Feb. 4, 1936 |

FOREIGN PATENTS

| | | |
|---|---|---|
| 647,849 | Germany | June 24, 1937 |